(12) United States Patent
Zhu et al.

(10) Patent No.: US 12,149,360 B2
(45) Date of Patent: Nov. 19, 2024

(54) DOWNLINK CONTROL INFORMATION TRANSMISSION METHOD AND DEVICE, AND STORAGE MEDIUM

(71) Applicants: BEIJING XIAOMI MOBILE SOFTWARE CO., LTD., Beijing (CN); BEIJING UNIVERSITY OF POSTS AND TELECOMMUNICATIONS, Beijing (CN)

(72) Inventors: Yajun Zhu, Beijing (CN); Wei Hong, Beijing (CN); Junli Li, Beijing (CN); Yong Li, Beijing (CN)

(73) Assignees: BEIJING XIAOMI MOBILE SOFTWARE CO., LTD., Beijing (CN); BEIJING UNIVERSITY OF POSTS AND TELECOMMUNICATIONS, Beijing (CN)

(*) Notice: Subject to any disclaimer, the term of this patent is extended or adjusted under 35 U.S.C. 154(b) by 387 days.

(21) Appl. No.: 17/631,425

(22) PCT Filed: Jul. 30, 2019

(86) PCT No.: PCT/CN2019/098464
§ 371 (c)(1),
(2) Date: Jan. 28, 2022

(87) PCT Pub. No.: WO2021/016895
PCT Pub. Date: Feb. 4, 2021

(65) Prior Publication Data
US 2022/0286233 A1   Sep. 8, 2022

(51) Int. Cl.
*H04L 1/18* (2023.01)
*H04L 1/1607* (2023.01)
*H04L 1/1812* (2023.01)

(52) U.S. Cl.
CPC .......... *H04L 1/1812* (2013.01); *H04L 1/1614* (2013.01); *H04L 1/1671* (2013.01)

(58) Field of Classification Search
CPC ... H04L 1/1812; H04L 1/1614; H04L 1/1671; H04L 1/1822; H04L 5/0055; H04L 5/0057
See application file for complete search history.

(56) References Cited

U.S. PATENT DOCUMENTS

2017/0201932 A1   7/2017   Yeh et al.
2019/0132824 A1*  5/2019   Jeon .......................... H04L 5/00
(Continued)

FOREIGN PATENT DOCUMENTS

CN   107483160 A   12/2017
CN   108401480 A   8/2018
(Continued)

OTHER PUBLICATIONS

International Search Report of PCT/CN2019/098464 dated Apr. 21, 2020 with English translation, (4p).
(Continued)

*Primary Examiner* — Walli Z Butt
(74) *Attorney, Agent, or Firm* — Arch & Lake LLP

(57) ABSTRACT

A data transmission method includes: sending, by a network device, a fixed-length downlink control information (DCI), wherein the fixed-length DCI comprises a detection parameter corresponding to a variable-length DCI.

12 Claims, 7 Drawing Sheets

(56) References Cited

U.S. PATENT DOCUMENTS

2019/0363843 A1* 11/2019 Gordaychik .............. H04L 1/08
2022/0022248 A1* 1/2022 Kwak .................. H04L 5/0096

FOREIGN PATENT DOCUMENTS

| CN | 108401486 A | 8/2018 |
|---|---|---|
| CN | 108631951 A | 10/2018 |
| CN | 108668369 A | 10/2018 |
| CN | 109075923 A | 12/2018 |
| CN | 109088707 A | 12/2018 |
| CN | 109152004 A | 1/2019 |
| CN | 109644370 A | 4/2019 |
| CN | 109699054 A | 4/2019 |

OTHER PUBLICATIONS

Qualcomm et al., "R1-1701478 WF on 2-Stage DCI for NR", 3GPP, Jan. 20, 2017, (3p).

Interdigital Inc., "R1-1716257 CBG-based (re)-transmission", 3GPP, Sep. 21, 2017, (5p).

First Office Action to Chinese Application No. 201980001622.7 dated Aug. 24, 2021 with English translation, (16p).

LG Electronics, Consideration on UCI Signaling for CBG based HARQ, 3GPP TSG RAN WG1 Meeting NR Ad-Hoc#2, R1-1710331, Qingdao, China Jun. 27-30, 2017, (5p).

Samsung, "Summary of Email discussion on [NRAH2-08] Down-selection of CBG-based (re)transmission", 3GPP TSG RAN WG1 Meeting #90, R1-1713640, Prague, CH, Aug. 21-25, 2017, (19p).

Second Office Action issued to Chinese Application No. 201980001622.7 dated Jan. 7, 2022 with English translation, (8p).

Huawei, et al., "DCI monitoring occasions and blind detections", 3GPP TSG-RAN WG1 Meeting #88, R1-1701643, Athens, Greece Feb. 13-17, 2017, (5p).

LG Electronics, "Discussion on configurability of DCI contents," 3GPP TSG RAN WG1 Meeting #89, R1-1707633, Hangzhou, China, May 15-19, 2017, (4p).

Oppo, "Resource allocation for PDSCH/PUSCH", 3GPP TSG RAN WG1, Meeting 91, R1-1719973, Reno, NV, Nov. 27, 2017, (10p).

Nokia, "On support of UL transmission with configured grants in NR-U", 3GPP TSG RAN WG1 Meeting #96bis, Xi'an, China, Apr. 8-12, 2019, (10p).

RAN1 Chairman's Notes, 3GPP TSG RAN WG1 Meeting #96bis, Xi'an, China, Apr. 8-12, 2019, (107p).

* cited by examiner

DOWNLINK CONTROL INFORMATION TRANSMISSION METHOD AND DEVICE, AND STORAGE MEDIUM

CROSS-REFERENCE TO RELATED APPLICATION

This application is the U.S. national stage application of PCT Application No. PCT/CN2019/098464, filed Jul. 30, 2019, the entire contents of which are incorporated herein by reference for all purposes.

TECHNICAL FIELD

This application relates to, but is not limited to, the field of wireless communication technology, and in particular to a method, an apparatus, and a storage medium for data transmission.

BACKGROUND

With the increasing demand for various services of the 5G (5th Generation) mobile communication network technology, the shortage of spectrum resources has become an increasingly severe problem for mobile communication networks, and the use of licensed spectrum has been unable to meet the growth of service requirements. Therefore, mobile networks need to be deployed on unlicensed frequency bands.

In the 5G NR (New Radio) system, CG (Configured Grant) is adopted to configure resources for periodic services. In the NR-U (New Radio Based Unlicensed Access) technology that adopts CG, initial transmission is performed on CG resources in a non-scheduled manner, and retransmission is scheduled on dedicated resources through UL (UpLink) grant. However, the signaling overhead of UL grant scheduling is too large in related art.

SUMMARY

In view of above, embodiments of the disclosure provide a method, an apparatus, and a storage medium for data transmission.

According to a first aspect of the disclosure, there is provided a data transmission method, including:
sending a fixed-length downlink control information (DCI), wherein the fixed-length DCI includes a detection parameter corresponding to a variable-length DCI.

In some embodiments, the method further includes:
sending, when the detection parameter indicates the variable-length DCI is to be sent, the variable-length DCI according to the detection parameter.

In some embodiments, the fixed-length DCI further includes: a first hybrid automatic repeat request (HARQ) bitmap and a bitmap flag bit,
when the bitmap flag bit is a first value, the first HARQ bitmap indicates feedback information of a transport block in at least one HARQ process, wherein each of the at least one HARQ process transmits one transport block;
when the bitmap flag bit is a second value, the first HARQ bitmap indicates feedback information of at least one code block group of at least one transport block.

In some embodiments, the method further includes:
when the bitmap flag bit is the first value, the variable-length DCI indicates feedback information of at least one code block group in a transport block that is not successfully received.

In some embodiments, the variable-length DCI indicates the feedback information of the at least one code block group in the transport block that is not successfully received includes:
the variable-length DCI is in form of a bitmap used for indicating the feedback information of the at least one code block group in the transport block that is not successfully.

In some embodiments, the method further includes:
when the bitmap flag bit is the second value, the variable-length DCI includes a second HARQ bitmap;
wherein the second HARQ bitmap indicates feedback information of a remaining code block group other than the at least one code block group whose feedback information is indicated by the first HARQ bitmap.

In some embodiments, the method further includes:
determining a length of the variable-length DCI according to a length of information contained in the variable-length DCI.

In some embodiments, the detection parameter corresponding to the variable-length DCI includes at least one of:
a parameter used for indicating frequency domain resource occupied for sending the variable-length DCI;
a parameter used for indicating time domain resource occupied for sending the variable-length DCI;
a parameter used for indicating length information of the variable-length DCI.

According to a second aspect of the disclosure, there is provided a data transmission method, including:
receiving a fixed-length downlink control information (DCI), wherein the fixed-length DCI includes a detection parameter corresponding to a variable-length DCI.

In some embodiments, the method further includes:
receiving, when the detection parameter indicates the variable-length DCI is to be sent, the variable-length DCI according to the detection parameter.

In some embodiments, the fixed-length DCI further includes: a first hybrid automatic repeat request (HARQ) bitmap and a bitmap flag bit,
when the bitmap flag bit is a first value, retransmitting, according to the first HARQ bitmap, a transport block that is not successfully received in at least one HARQ process;
when the bitmap flag bit is a second value, retransmitting, according to the first HARQ bitmap, at least one code block group of at least one transport block that is not successfully received.

In some embodiments, the method further includes:
when the bitmap flag bit is the first value, retransmitting, according to feedback information indicated by the variable-length DCI and corresponding to at least one code block group in a transport block that is not successfully received, the code block group that is not successfully received.

In some embodiments, when the bitmap flag bit is the first value, the retransmitting, according to the feedback information indicated by the variable-length DCI and corresponding to the at least one code block group in the transport block that is not successfully received, the code block group that is not successfully received includes:
when the bitmap flag bit is the first value, retransmitting, according to the feedback information indicated by the variable-length DCI in form of a bitmap and corresponding to the at least one code block group in the transport block that is not successfully received, the code block group that is not successfully received.

In some embodiments, the method further includes:
when the bitmap flag bit is the second value, retransmitting, according to a second HARQ bitmap included in the variable-length DCI, a code block group that is not successfully received and indicated by the second HARQ bitmap.

In some embodiments, the method further includes at least one of:

determining frequency domain resource used for receiving the variable-length DCI according to the detection parameter corresponding to the variable-length DCI;

determining time domain resource used for receiving the variable-length DCI according to the detection parameter corresponding to the variable-length DCI;

determining length information of the variable-length DCI according to the detection parameter corresponding to the variable-length DCI.

According to a third aspect of the disclosure, there is provided a data transmission apparatus, including:

a sending module, configured to send a fixed-length downlink control information (DCI), wherein the fixed-length DCI includes a detection parameter corresponding to a variable-length DCI.

In some embodiments, the sending module includes:

a sending submodule, configured to send, when the detection parameter indicates the variable-length DCI is to be sent, the variable-length DCI according to the detection parameter.

In some embodiments, the fixed-length DCI further includes: a first hybrid automatic repeat request (HARQ) bitmap and a bitmap flag bit, when the bitmap flag bit is a first value, the first HARQ bitmap indicates feedback information of a transport block in at least one HARQ process, wherein each of the at least one HARQ process transmits one transport block;

when the bitmap flag bit is a second value, the first HARQ bitmap indicates feedback information of at least one code block group of at least one transport block.

In some embodiments, when the bitmap flag bit is the first value, the variable-length DCI indicates feedback information of at least one code block group in a transport block that is not successfully received.

In some embodiments, the variable-length DCI is in form of a bitmap used for indicating the feedback information of the at least one code block group in the transport block that is not successfully.

In some embodiments, when the bitmap flag bit is the second value, the variable-length DCI includes a second HARQ bitmap;

wherein the second HARQ bitmap indicates feedback information of a remaining code block group other than the at least one code block group whose feedback information is indicated by the first HARQ bitmap.

In some embodiments, the apparatus further includes: a determining module, configured to determine a length of the variable-length DCI according to a length of information contained in the variable-length DCI.

In some embodiments, the detection parameter corresponding to the variable-length DCI includes at least one of:

a parameter used for indicating frequency domain resource occupied for sending the variable-length DCI;

a parameter used for indicating time domain resource occupied for sending the variable-length DCI;

a parameter used for indicating length information of the variable-length DCI.

According to a fourth aspect of the disclosure, there is provided a data transmission apparatus, including:

a receiving module, configured to receive a fixed-length downlink control information (DCI), wherein the fixed-length DCI includes a detection parameter corresponding to a variable-length DCI.

In some embodiments, the receiving module includes:

a receiving submodule, configured to receive, when the detection parameter indicates the variable-length DCI is to be sent, the variable-length DCI according to the detection parameter.

In some embodiments, the fixed-length DCI further includes: a first hybrid automatic repeat request (HARQ) bitmap and a bitmap flag bit, the apparatus further includes:

a first retransmission module, configured to retransmit, when the bitmap flag bit is a first value, a transport block that is not successfully received in at least one HARQ process according to the first HARQ bitmap; and retransmit, when the bitmap flag bit is a second value, at least one code block group of at least one transport block that is not successfully received according to the first HARQ bitmap.

In some embodiments, the apparatus further includes:

a second retransmission module, configured to, when the bitmap flag bit is the first value, retransmit, according to feedback information indicated by the variable-length DCI and corresponding to at least one code block group in a transport block that is not successfully received, the code block group that is not successfully received.

In some embodiments, the second retransmission module includes:

a retransmission submodule, configured to, when the bitmap flag bit is the first value, retransmit, according to the feedback information indicated by the variable-length DCI in form of a bitmap and corresponding to the at least one code block group in the transport block that is not successfully received, the code block group that is not successfully received.

In some embodiments, the apparatus further includes:

a third retransmission module, configured to, when the bitmap flag bit is the second value, retransmit, according to a second HARQ bitmap included in the variable-length DCI, a code block group that is not successfully received and indicated by the second HARQ bitmap.

In some embodiments, the apparatus further includes at least one of:

a first determining module, configured to determine frequency domain resource used for receiving the variable-length DCI according to the detection parameter corresponding to the variable-length DCI;

a second determining module, configured to determine time domain resource used for receiving the variable-length DCI according to the detection parameter corresponding to the variable-length DCI;

a third determining module, configured to determine length information of the variable-length DCI according to the detection parameter corresponding to the variable-length DCI.

According to a fifth aspect of the disclosure, there is provided a data transmission device, including a processor, a memory, and an executable program stored on the memory and executable by the processor, wherein the processor is configured to, when executing the executable program perform steps of the data transmission method according to the first or second aspect.

According to a sixth aspect of the disclosure, there is provided a storage medium on which an executable program is stored, wherein the executable program is used for, when being executed by a processor, implementing steps of the data transmission method according to the first or second aspect.

It should be understood that the above general description and the following detailed description are only exemplary and explanatory, and cannot limit the embodiments of the disclosure.

BRIEF DESCRIPTION OF THE DRAWINGS

The drawings are incorporated into the specification and constitute a part thereof, illustrate embodiments consistent with the disclosure, and are used to explain principles of the embodiments of the disclosure together with the specification.

DETAILED DESCRIPTION

Figure 1:
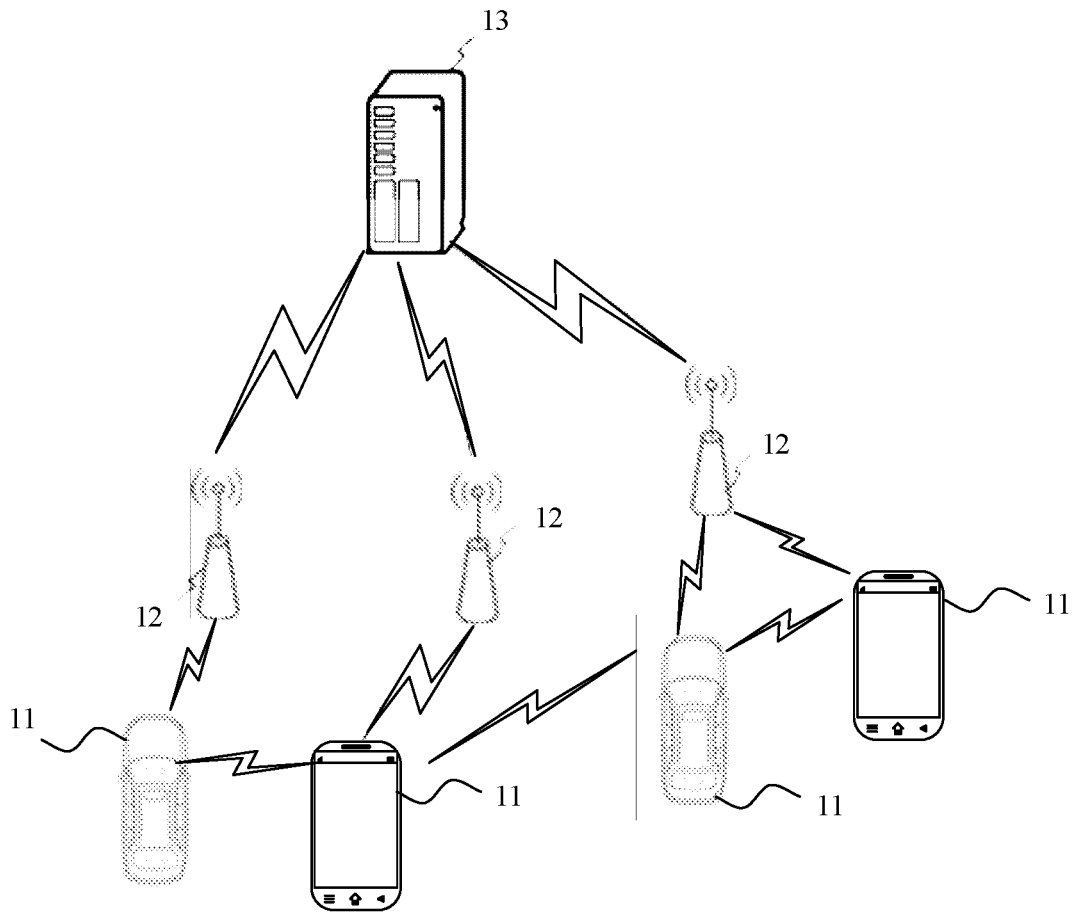
FIG. 1 is a schematic diagram showing a wireless communication system according to some exemplary embodiments.

Here, exemplary embodiments will be described in detail, and examples thereof are shown in the accompanying drawings. When the following description is made referring to the drawings, unless otherwise indicated, the same reference signs in different drawings indicate the same or similar elements. The implementation manners described in the following exemplary embodiments do not represent all implementation manners consistent with the embodiments of the disclosure. Instead, they are merely examples of devices and methods consistent with some aspects of the embodiments of the disclosure as detailed in the appended claims.

The terms used in the embodiments of the disclosure are only for the purpose of describing specific embodiments, and are not intended to limit the embodiments of the disclosure. The singular forms of "a", "said" and "the" used in the embodiments of the disclosure and the appended claims are also intended to include plural forms, unless the context clearly indicates other meanings. It should also be understood that the term "and/or" used herein refers to and includes any or all possible combinations of one or more associated listed items.

It should be understood that although the terms first, second, third, and the like may be used to describe various information in the embodiments of the disclosure, the information should not be limited to these terms. These terms are only used to distinguish the same type of information from each other. For example, without departing from the scope of the embodiments of the disclosure, the first information may also be referred to as second information, and similarly, the second information may also be referred to as first information. Depending on the context, the word "if" as used herein can be interpreted as "when" or "while" or "in response to determination".

Referring to FIG. 1, which shows a schematic diagram of a wireless communication system according to some embodiments of the disclosure. As shown in FIG. 1, the wireless communication system is a communication system based on cellular mobile communication technology, and the wireless communication system may include several terminals 11 and several base stations 12.

In some embodiments, the terminal 11 may be a device that provides voice and/or data connectivity to the user. The terminal 11 can communicate with one or more core networks via a radio access network (RAN). The terminal 11 can be an IoT terminal, such as a sensor device, a mobile phone (or "cellular" phone), and a computer provided with the IoT terminal. For example, it may be a fixed, portable, pocket-sized, handheld, computer-built-in or vehicle-mounted device, such as station (STA), subscriber unit, subscriber station, mobile station, mobile site, remote station, access point, remote terminal, access terminal, user terminal, user agent, user device, or user equipment (UE). Alternatively, the terminal 11 may also be an unmanned aerial vehicle. Alternatively, the terminal 11 may also be an in-vehicle device, for example, it may be an electronic control unit (ECU) with a wireless communication function, or a wireless communication device in external connection with ECU. Alternatively, the terminal 11 may also be a roadside device, for example, it may be a street lamp, a signal lamp, or other roadside device with the wireless communication function.

The base station 12 may be a network side device in the wireless communication system. In some embodiments, the wireless communication system may be the 4th generation mobile communication (4G) system, also known as the long term evolution (LTE) system. Alternatively, the wireless communication system may also be a 5G system, also known as the new radio (NR) system or 5G NR system. Alternatively, the wireless communication system may also be the next-generation system of the 5G system. In some embodiments, the access network in the 5G system can be called NG-RAN (New Generation-Radio Access Network) or MTC system.

In some embodiments, the base station 12 may be an evolved node B (eNB) used in the 4G system. Alternatively, the base station 12 may also be a gNB that adopts a centralized distributed architecture in the 5G system. When the base station 12 adopts the centralized distributed architecture, it typically includes a central unit (CU) and at least two distributed units (DU). The CU is provided with a packet data convergence protocol (PDCP) layer, a radio link control (RLC) layer, and a media access control (MAC) layer. The DU is provided with a physical (PHY) layer protocol stack. The embodiments of the disclosure do not limit the specific implementation of the base station 12.

A wireless connection can be established between the base station 12 and the terminal 11 through a wireless air interface. In some embodiments, the wireless air interface is based on the 4G standard; or, the wireless air interface is based on the 5G standard, such as a new air interface; or, the wireless air interface may also be based on 5G-based next-generation mobile communication network technology standards.

In some embodiments, E2E (End to End) connections may also be established between the terminals 11, for example, V2V (vehicle to vehicle) connection, V2I (vehicle to Infrastructure) connection, and V2P (vehicle to pedestrian) connection in vehicle-to-everything (V2X) communication scenario.

In some embodiments, the above-mentioned wireless communication system may further include a network management device 13.

Several base stations 12 are connected to the network management device 13 respectively. The network management device 13 may be a core network device in a wireless communication system. For example, the network management device 13 may be a mobility management entity (MME) in an evolved packet core (EPC) network. Alternatively, the network management device may also be other core network devices, such as serving gate way (SGW), public data network gate way (PGW), policy and charging rules function (PCRF), home subscriber server (HSS), and the like. The implementation form of the network management device 13 is not limited in the embodiments of the disclosure.

The execution subject involved in the embodiments of the disclosure includes but is not limited to a terminal or a base station in a wireless communication system.

An application scenario of some embodiments of the disclosure is that in the NR-U technology that uses configured grant, the initial transmission is performed on the configured grant resource in a non-scheduled manner, and the retransmission is scheduled on a dedicated resource using UL grant. There are two manner to allocate retransmission resources.

Figure 2:
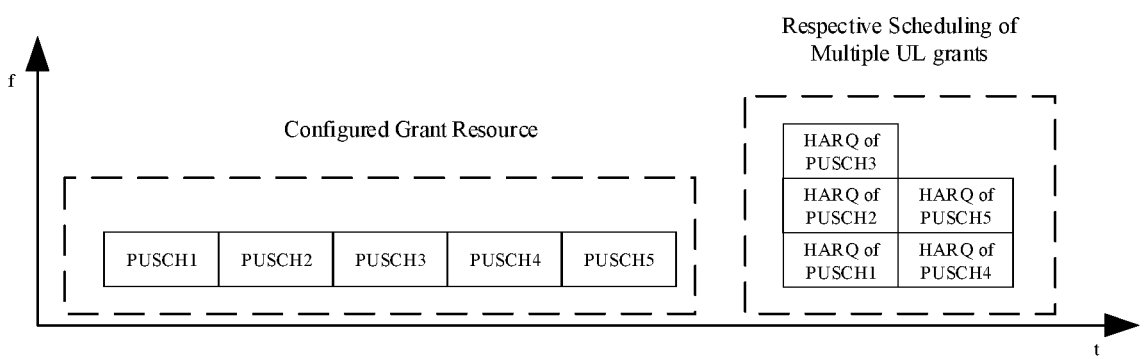
FIG. 2 is a schematic diagram showing a retransmission scenario of multiple HARQ processes according to some exemplary embodiments.

In the first manner, multiple UL grants are adopted, respectively, to schedule multiple different HARQ processes for retransmission on dedicated scheduling resources. As shown in FIG. 2, when the UE transmits a total of 5 HARQ processes on the configured grant resources, if there is a code block group (CBG) transmission error in each process, dedicated scheduling resources allocate by UL grant are used to support retransmission. In other words, the 5G gNB uses 5 UL grants to schedule the UE to allocate dedicated resources for the physical uplink data channel (PUSCH) to retransmit unsuccessfully received data. At this time, because the base station sends multiple UL grants to indicate the CBGs that were not successfully received in the HARQ processes and the retransmission resources, the signaling overhead is too large.

Figure 3:
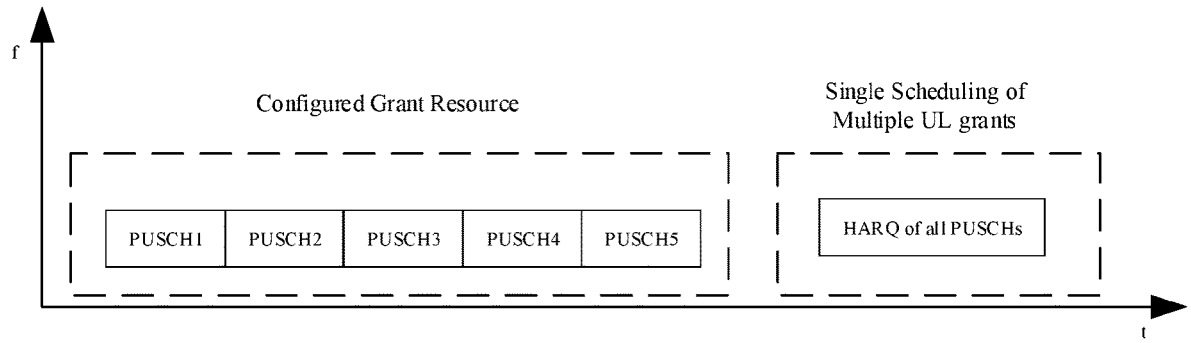
FIG. 3 is a schematic diagram showing another retransmission scenario of multiple HARQ processes according to some exemplary embodiments.

In the second manner, in order to solve the problem of excessive DCI overhead that may be caused by the first manner, a new UL grant format is introduced, and a single UL grant is used to schedule multiple HARQ processes for retransmission on the configured grant resources. As shown in FIG. 3, when the UE transmits a total of 5 HARQ processes on the configured grant resources, if there are CBG transmission errors in each process, UL grant indicates retransmission on the configured grant resources. In other words, the gNB uses a single UL grant to schedule the UE to allocate dedicated resources for PUSCH to retransmit unsuccessfully received data. At this time, since the base station only sends the single UL grant to indicate the CBG retransmission due to CBG transmission errors in the HARQ processes, the signaling overhead caused by multiple UL grants is reduced.

However, if the second manner is directly used in NR-U CG, when CBG-level acknowledgment/non-acknowledgement (A/N, ACK/NACK) feedback information including all HARQ processes is required to support CBG-based retransmission, the signaling overhead of the single UL grant is too large.

Figure 4:
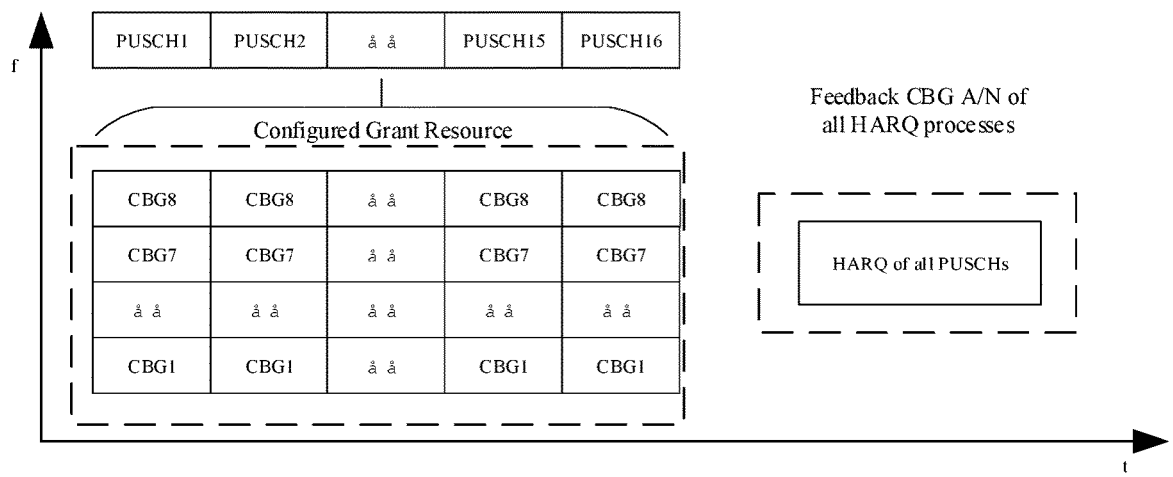
FIG. 4 is a schematic diagram showing still another retransmission scenario of multiple HARQ processes according to some exemplary embodiments.

A typical scenario is shown in FIG. 4, assuming the UE transmits a total of 16 HARQ processes on the configured grant resources and each process transmits 8 CBGs, and there are CBG transmission errors in each process. At this time, for all the HARQ processes, a very large UL grant overhead will be caused by including CBG-level A/N, making it difficult to include all feedback in one DCI. Moreover, because the length of DCI needs to change according to the number of retransmitted CBGs, blind detection complexity at the UE side is increased.

Figure 5:
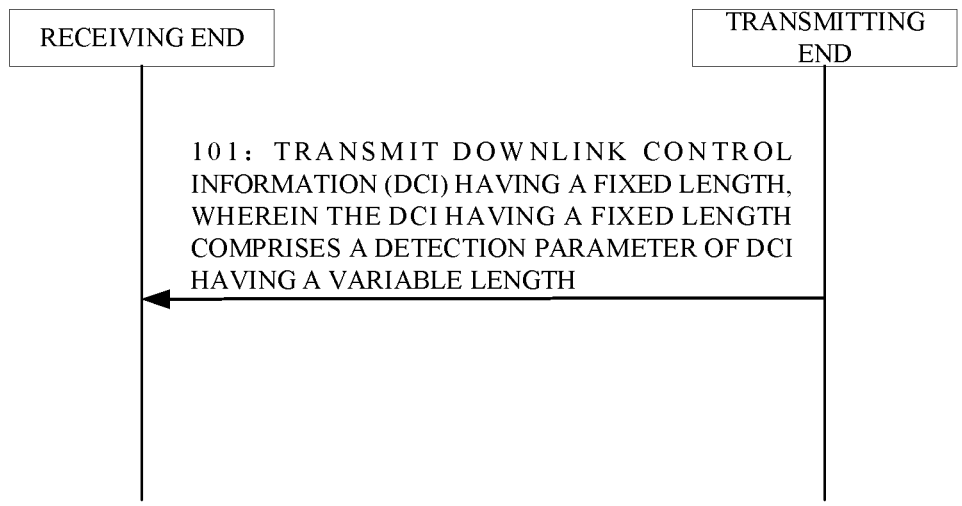
FIG. 5 is a schematic flowchart of a data transmission method according to some exemplary embodiments.

As shown in FIG. 5, some exemplary embodiments provide a data transmission method. The data transmission method can be applied to a sending end of wireless communication and may include following steps.

In step 101, a fixed-length DCI is sent, where the fixed-length DCI includes a detection parameter corresponding to a variable-length DCI.

In some embodiments, HARQ feedback information corresponding to each HARQ process may be provided in the fixed-length DCI; or may also be provided in the variable-length DCI. The HARQ feedback information may be A/N feedback information at the level of transport block (TB) or A/N feedback information at the level of CBG. In some embodiments, the A/N feedback information at the TB level may be a bitmap indicating reception of TBs in each HARQ process; the A/N feedback information at the CBG level may be a bitmap indicating reception of CBGs in TBs in each HARQ process.

The number of bits contained in the fixed-length DCI is fixed, and the number of bits contained in the variable-length DCI is variable. The length of the variable-length DCI dynamically changes with the length of information as contained.

The fixed-length DCI and variable-length DCI may be sent by a sending end such as the base station, and the fixed-length DCI and variable-length DCI may be received by a receiving end such as the terminal.

The fixed-length DCI may carry uplink and downlink resource allocation information, power control information, and the like.

In some embodiments, the fixed-length DCI may carry the HARQ feedback information, which indicates the reception of data in the HARQ process.

The detection parameter corresponding to the variable-length DCI may be used for indicating transmission resource information of the variable-length DCI, and the receiving end can receive the variable-length DCI according to the transmission resource information.

On the one hand, based on adoption of the fixed-length DCI, the complexity of blind detection at the receiving end can be reduced, and the efficiency of receiving the fixed-length DCI can be improved. On the other hand, the detection parameter can provide indication and resource information for the receiving end to receive the variable-length DCI, thereby improving the convenience of receiving the variable-length DCI, reducing the difficulty for blind detection of the variable-length DCI, and reducing excessive power consumption due to the blind detection.

In some embodiments, the method further includes: when the detection parameter indicates that the variable-length DCI is to be sent, sending the variable-length DCI according to the detection parameter; or, when the detection parameter indicates that no variable-length DCI is to be sent, not sending the variable-length DCI.

The detection parameter may include one or more identification bits. For example, the detection parameter includes an identification bit used for indicating whether there is a variable-length DCI requiring to be sent. The detection parameter may also indicate whether there is a variable-length DCI to be sent through the content contained in the detection parameter. For example, when the detection parameter does not indicate any transmission resource information, it indicates that no variable-length DCI is to be sent; when the detection parameter indicates that there is transmission resource information, it indicates that there is a variable-length DCI requiring to be sent.

After receiving the fixed-length DCI, the receiving end may determine whether there is a variable-length DCI to be received according to the detection parameter. If there is a variable-length DCI to be received, the variable-length DCI is received according to the transmission resource indicated by the detection parameter.

In some embodiments, the fixed-length DCI further includes: a first HARQ bitmap and a bitmap flag bit. In some embodiments, when the bitmap flag bit has a first value, the first HARQ bitmap indicates feedback information of a TB in at least one HARQ process, where one HARQ process transmits one TB; when the bitmap flag bit has a second value, the first HARQ bitmap indicates feedback information of at least one CBG of at least one TB.

In some embodiments, the first HARQ bitmap indicates HARQ feedback information to the receiving end in the form of a bitmap. In the schematic diagram of the fixed-length DCI and variable-length DCI shown in FIG. 6, the HARQ bitmap represents the first HARQ bitmap, and the Flag TB represents the bitmap flag bit. The Flag TB may occupy one bit, and may be used for indicating the content in the first HARQ bitmap through two different values. For example, when Flag TB is "0", it means that the current HARQ feedback is TB level, and the first HARQ bitmap indicates the feedback information of TB in the HARQ process; when Flag TB is "1", it means that the current HARQ feedback is CBG level, and the first HARQ bitmap indicates the feedback information of CBG in TB of the HARQ process. The feedback information may be A/N feedback information for TB or CBG. In some embodiments, the HARQ bitmap may occupy 16 bits.

Figure 7:
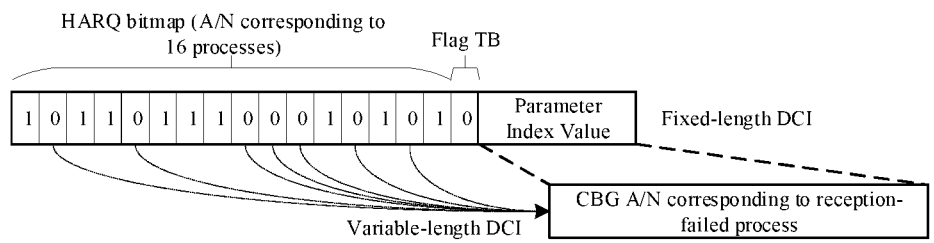
FIG. 7 is a schematic diagram showing another DCI format according to some exemplary embodiments.

As shown in FIG. 7, when Flag TB is "0", the HARQ bitmap indicates the A/N feedback information of each TB in the HARQ process shown in FIG. 4, where "1" indicates that the corresponding TB is successfully received, "0" indicates that the corresponding TB was not successfully received. The receiving end retransmits the unsuccessfully received TB to the sending end according to the A/N feedback information of the TB indicated by the HARQ bitmap.

Figure 8:
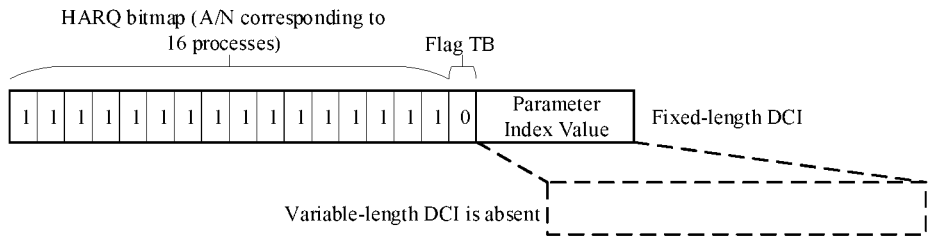
FIG. 8 is a schematic diagram showing still another DCI format according to some exemplary embodiments.

In some embodiments shown in FIG. 8, Flag TB is "0", and the HARQ bitmap uses "1" to indicate that the TBs in each HARQ process are successfully received.

Figure 9:
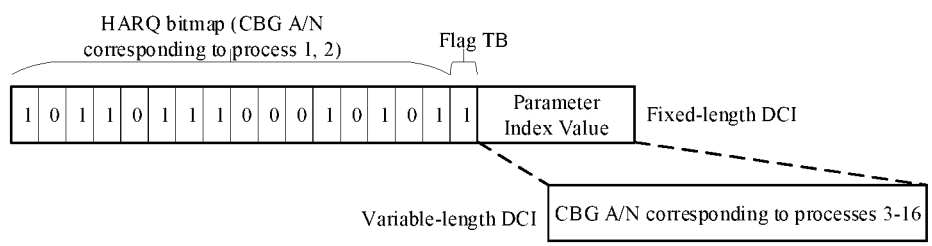
FIG. 9 is a schematic diagram showing yet another DCI format according to some exemplary embodiments.

As shown in FIG. 9, when Flag TB is "1", the HARQ bitmap indicates the A/N feedback information of CBG in each TB in the HARQ process shown in FIG. 4, where "1" indicates that the corresponding CBG is successfully received, "0" indicates that the corresponding CBG is not successfully received. Due to the limitation of the number of bits of the HARQ bitmap, for example, the 16-bit HARQ bitmap can only indicate the A/N feedback information of the CBGs in two TBs. According to the A/N feedback information of CBG in TB indicated by the HARQ bitmap, the receiving end retransmits the unsuccessfully received CBG in the TB to the sending end, or retransmits the TB containing the unsuccessfully received CBG to the sending end.

Based on sending the HARQ feedback information by using the fixed-length DCI, the complexity of blind detection at the receiving end can be reduced, the reception efficiency of the fixed-length DCI can be improved, and the retransmission efficiency of the configured grant can be further improved.

In some embodiments, the method further includes: when the bitmap flag bit has the first value, the variable-length DCI indicates feedback information of at least one CBG in the TB that has not been successfully received.

When the bitmap flag bit has the first value, the first HARQ bitmap indicates feedback information of at least one TB in the HARQ process. For the unsuccessfully received TB, the variable-length DCI may be used for indicating the feedback information of CBGs in the unsuccessfully received TB. In this way, the first HARQ bitmap can be used to implement the A/N information feedback at the TB level, and the variable-length DCI can be used to implement the A/N information feedback at the CBG level.

After receiving the fixed-length DCI, the receiving end determines whether there is a variable-length DCI to be received according to the detection parameter. If there is a variable-length DCI to be received, the variable-length DCI is received according to the receiving resource indicated by the detection parameter. The receiving end can retransmit the unsuccessfully received TB indicated by the first HARQ bitmap, or retransmit the unsuccessfully received CBG indicated by the variable-length DCI.

As shown in FIG. 7, when Flag TB is "0", the HARQ bitmap indicates the A/N feedback information of each TB in the HARQ process shown in FIG. 4, where "0" indicates that the corresponding TB is unsuccessfully received, and the variable-length DCI can be used for indicating the feedback information of CBGs in the unsuccessfully received TB. The receiving end can retransmit the CBG in the unsuccessfully received TB indicated by the variable-length DCI.

Based on the HARQ feedback information achieved by the fixed-length DCI and variable-length DCI, on the one hand, through adoption of the fixed-length DCI, the complexity of blind detection at the receiving end can be reduced, the reception efficiency of the fixed-length DCI can be improved, and the retransmission efficiency of configured grant can be further improved; on the other hand, through adoption of the variable-length DCI, the length of the HARQ feedback information that can be carried is thus extended, and different types of HARQ feedback information can be carried by the variable-length DCI and the fixed-length DCI, thereby meeting different requirements of feedback information. Furthermore, HARQ feedback information is transmitted through two DCIs, so the size of DCI signaling can be controlled and signaling overhead thereof can be reduced.

In some embodiments, the variable-length DCI indicates feedback information of at least one CBG in the unsuccessfully received TB, specifically, the variable-length DCI is in the form of a bitmap, so as to indicate the feedback information of at least one CBG in the TB that was not successfully received.

In some embodiments, the feedback information of CBG may be indicated in the form of a bitmap. For example, "1" in the bitmap indicates that the CBG is successfully received, and "0" indicates that the CBG is not successfully received. In the form of a bitmap, the reception status of each CBG can be explicitly fed back, thereby improving the visibility of HARQ feedback information.

In some embodiments, the method further includes: when the bitmap flag bit has a second value, the variable-length DCI includes a second HARQ bitmap; wherein, the second HARQ bitmap indicates feedback information of a remaining CBG other than the at least one CBG whose feedback information is indicated by the first HARQ bitmap.

In other words, the second HARQ bitmap indicates the feedback information of CBG which is not indicated by the first HARQ bitmap.

In some embodiments, the first HARQ bitmap and the second HARQ bitmap are jointly used for the feedback information of CBGs to implement feedback information at the CBG level.

The receiving end can retransmit the unsuccessfully received CBG indicated by the first HARQ bitmap and the second HARQ bitmap.

As shown in FIG. 9, the HARQ bitmap and the second HARQ bitmap included in the variable-length DCI are together used for indicating the A/N feedback information of the CBGs in each TB of the HARQ process shown in FIG. 4. In some embodiments, the HARQ bitmap indicates the A/N feedback information of CBGs in two TBs, and the second HARQ bitmap indicates the A/N feedback information of CBGs in the remaining 14 TBs. After receiving the fixed-length DCI and the variable-length DCI, the receiving end can retransmit the CBGs of each TB in the HARQ process as jointly indicated by the HARQ bitmap and the second HARQ bitmap included in the variable-length DCI.

Through indicating the unsuccessfully received CBGs by the first HARQ bitmap and the second HARQ bitmap, the length of the feedback information can be extended and complete CBG feedback information can be provided.

In some embodiments, the method further includes determining the length of the variable-length DCI according to the length of the information contained in the variable-length DCI.

In some embodiments, the length of the variable-length DCI can be adjusted according to the information contained in the DCI, such as the length of the A/N feedback information of CBG. In this way, the variable-length DCI can be adaptive to the A/N feedback information of CBGs of different lengths.

In some embodiments, the detection parameter corresponding to the variable-length DCI includes at least one of the following: a parameter used for indicating frequency domain resource occupied for sending the variable-length DCI; a parameter used for indicating time domain resource occupied for sending the variable-length DCI; and a parameter used for indicating length information of the variable-length DCI.

After determining the resource for sending the variable-length DCI, the sending end uses the detection parameter to indicate the transmission resource, and then places it in the fixed-length DCI for being sent to the receiving end. After receiving the fixed-length DCI, the receiving end determines the transmission resource of the variable-length DCI according to the detection parameter, so as to receive the variable-length DCI.

Based on the HARQ feedback information achieved by the fixed-length DCI and variable-length DCI, on the one hand, through adoption of the fixed-length DCI, the complexity of blind detection at the receiving end can be reduced, and the retransmission efficiency of configured grant can be improved; on the other hand, through adoption of the variable-length DCI, different types of HARQ feedback information can be carried, thereby adapting to HARQ feedback information of different lengths. The HARQ feedback information is transmitted in two stages to reduce the size of DCI signaling.

Figure 10:
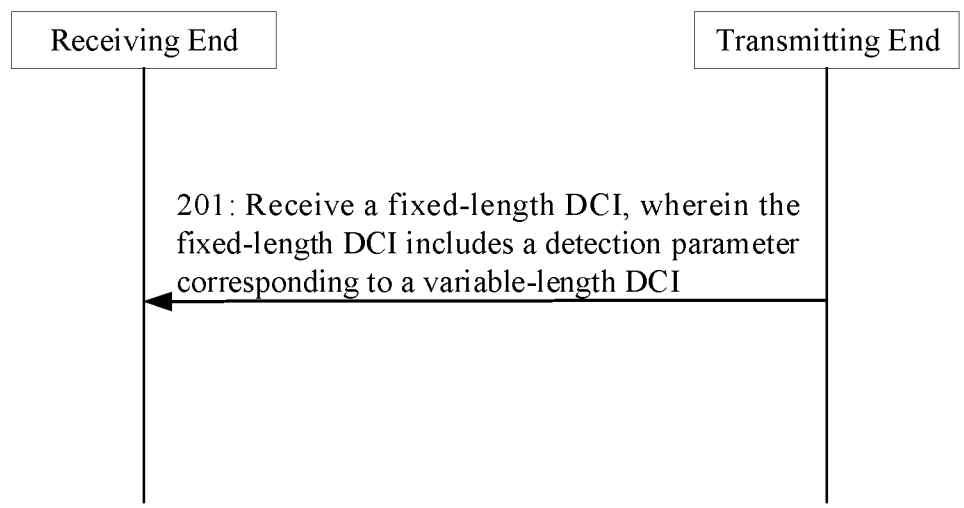
FIG. 10 is a schematic flowchart of a data transmission method according to some exemplary embodiments.

As shown in FIG. 10, some exemplary embodiments provide a data transmission method. The data transmission method can be applied to the receiving end of wireless communication and may include following steps.

In step 201, a fixed-length DCI is received, where the fixed-length DCI includes a detection parameter corresponding to a variable-length DCI.

In some embodiments, HARQ feedback information corresponding to each HARQ process may be provided in the fixed-length DCI; or may also be provided in the variable-length DCI. The HARQ feedback information may be A/N feedback information at the level of TB or A/N feedback information at the level of CBG. In some embodiments, the A/N feedback information at the TB level may be a bitmap indicating reception of TBs in each HARQ process; the A/N feedback information at the CBG level may be a bitmap indicating reception of CBGs in TBs in each HARQ process.

The number of bits contained in the fixed-length DCI is fixed, and the number of bits contained in the variable-length DCI is variable. The length of the variable-length DCI dynamically changes with the length of information as contained.

The fixed-length DCI and variable-length DCI may be sent by a sending end such as the base station, and the fixed-length DCI and variable-length DCI may be received by a receiving end such as the terminal.

The fixed-length DCI may carry uplink and downlink resource allocation information, power control information, and the like.

In some embodiments, the fixed-length DCI may carry the HARQ feedback information, which indicates the reception of data in the HARQ process.

The detection parameter corresponding to the variable-length DCI may be used for indicating transmission resource information of the variable-length DCI, and the receiving end can receive the variable-length DCI according to the transmission resource information.

On the one hand, based on adoption of the fixed-length DCI, the complexity of blind detection at the receiving end can be reduced, and the efficiency of receiving the fixed-length DCI can be improved. On the other hand, the detection parameter can provide indication and resource information for the receiving end to receive the variable-length DCI, thereby improving the convenience of receiving the variable-length DCI.

In some embodiments, the method further includes: when the detection parameter indicates that the variable-length DCI is to be sent, receiving the variable-length DCI according to the detection parameter; or, when the detection parameter indicates that no variable-length DCI is to be sent, not receiving the variable-length DCI.

The detection parameter may include one or more identification bits. For example, the detection parameter includes an identification bit used for indicating whether there is a variable-length DCI requiring to be sent. The detection parameter may also indicate whether there is a variable-length DCI to be sent through the content contained in the detection parameter. For example, when the detection parameter does not indicate any transmission resource information, it indicates that no variable-length DCI is to be sent; when the detection parameter indicates that there is transmission resource information, it indicates that there is a variable-length DCI requiring to be sent.

After receiving the fixed-length DCI, the receiving end may determine whether there is a variable-length DCI to be received according to the detection parameter. If there is a variable-length DCI to be received, the variable-length DCI is received according to the transmission resource indicated by the detection parameter.

In some embodiments, the fixed-length DCI further includes: a first HARQ bitmap and a bitmap flag bit. In some embodiments, when the bitmap flag bit has a first value, a TB that is not successfully received in at least one HARQ process is retransmitted according to the first HARQ bitmap; and when the bitmap flag bit has a second value, at least one CBG of at least one TB that is not successfully received is retransmitted according to the first HARQ bitmap.

In some embodiments, the first HARQ bitmap indicates HARQ feedback information to the receiving end in the form of a bitmap.

Figure 6:
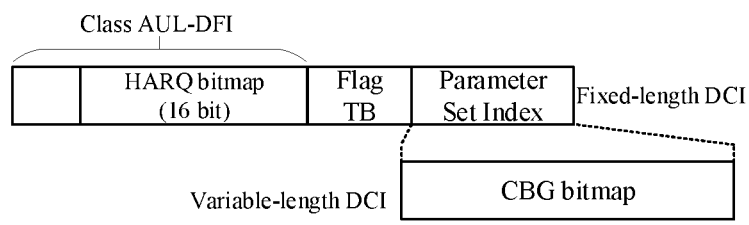
FIG. 6 is a schematic diagram showing a DCI format according to some exemplary embodiments.

In the schematic diagram of the fixed-length DCI and variable-length DCI shown in FIG. 6, the HARQ bitmap represents the first HARQ bitmap, and the Flag TB represents the bitmap flag bit. The Flag TB may occupy one bit, and may be used for indicating the content in the first HARQ bitmap through two different values. For example, when Flag TB is "0", it means that the current HARQ feedback is TB level, and the first HARQ bitmap indicates the feedback information of TB in the HARQ process; when Flag TB is "1", it means that the current HARQ feedback is CBG level, and the first HARQ bitmap indicates the feedback information of CBG in TB of the HARQ process. The feedback information may be A/N feedback information for TB or CBG. In some embodiments, the HARQ bitmap may occupy 16 bits.

As shown in FIG. 7, when Flag TB is "0", the HARQ bitmap indicates the A/N feedback information of each TB in the HARQ process shown in FIG. 4, where "1" indicates that the corresponding TB is successfully received, "0" indicates that the corresponding TB was not successfully received. The receiving end retransmits the unsuccessfully received TB to the sending end according to the A/N feedback information of the TB indicated by the HARQ bitmap.

In some embodiments shown in FIG. 8, Flag TB is "0", and the HARQ bitmap uses "1" to indicate that the TBs in each HARQ process are successfully received.

As shown in FIG. 9, when Flag TB is "1", the HARQ bitmap indicates the A/N feedback information of CBG in each TB in the HARQ process shown in FIG. 4, where "1" indicates that the corresponding CBG is successfully received, "0" indicates that the corresponding CBG is not successfully received. Due to the limitation of the number of bits of the HARQ bitmap, for example, the 16-bit HARQ bitmap can only indicate the A/N feedback information of the CBGs in two TBs. According to the A/N feedback information of CBG in TB indicated by the HARQ bitmap, the receiving end retransmits the unsuccessfully received CBG in the TB to the sending end, or retransmits the TB containing the unsuccessfully received CBG to the sending end.

Based on sending the HARQ feedback information by using the fixed-length DCI, the complexity of blind detection at the receiving end can be reduced, the reception efficiency of the fixed-length DCI can be improved, and the retransmission efficiency of the configured grant can be further improved.

In some embodiments, the method further includes: when the bitmap flag bit has the first value, retransmitting, according to feedback information indicated by the variable-length DCI and corresponding to at least one CBG in a TB that is not successfully received, the CBG that is not successfully received.

When the bitmap flag bit has the first value, the first HARQ bitmap indicates feedback information of at least one TB in the HARQ process. For the unsuccessfully received TB, the variable-length DCI may be used for indicating the feedback information of CBGs in the unsuccessfully received TB. In this way, the first HARQ bitmap can be used to implement the A/N information feedback at the TB level, and the variable-length DCI can be used to implement the A/N information feedback at the CBG level.

After receiving the fixed-length DCI, the receiving end determines whether there is a variable-length DCI to be received according to the detection parameter. If there is a variable-length DCI to be received, the variable-length DCI is received according to the receiving resource indicated by the detection parameter. The receiving end can retransmit the unsuccessfully received TB indicated by the first HARQ bitmap, or retransmit the unsuccessfully received CBG indicated by the variable-length DCI.

As shown in FIG. 7, when Flag TB is "0", the HARQ bitmap indicates the A/N feedback information of each TB in the HARQ process shown in FIG. 4, where "0" indicates that the corresponding TB is unsuccessfully received, and the variable-length DCI can be used for indicating the feedback information of CBGs in the unsuccessfully received TB. The receiving end can retransmit the CBG in the unsuccessfully received TB indicated by the variable-length DCI.

Based on the HARQ feedback information achieved by the fixed-length DCI and variable-length DCI, on the one hand, through adoption of the fixed-length DCI, the complexity of blind detection at the receiving end can be reduced, the reception efficiency of the fixed-length DCI can be improved, and the retransmission efficiency of configured grant can be further improved; on the other hand, through adoption of the variable-length DCI, the length of the HARQ feedback information that can be carried is thus extended, and different types of HARQ feedback information can be carried by the variable-length DCI and the fixed-length DCI, thereby meeting different requirements of feedback information. Furthermore, HARQ feedback information is transmitted through two DCIs, so the size of DCI signaling can be controlled and signaling overhead thereof can be reduced.

In some embodiments, when the bitmap flag bit has the first value, the retransmitting, according to the feedback information indicated by the variable-length DCI and corresponding to the at least one CBG in the TB that is not successfully received, the CBG that is not successfully received includes: when the bitmap flag bit has the first value, retransmitting, according to the feedback information indicated by the variable-length DCI in form of a bitmap and corresponding to the at least one CBG in the TB that is not successfully received, the CBG that is not successfully received.

In some embodiments, the feedback information of CBG may be indicated in the form of a bitmap. For example, "1" in the bitmap indicates that the CBG is successfully received, and "0" indicates that the CBG is not successfully received. In the form of a bitmap, the reception status of each CBG can be explicitly fed back, thereby improving the visibility of HARQ feedback information.

In some embodiments, the method further includes: when the bitmap flag bit has the second value, retransmitting, according to a second HARQ bitmap included in the variable-length DCI, a CBG that is not successfully received and indicated by the second HARQ bitmap.

In some embodiments, the first HARQ bitmap and the second HARQ bitmap are jointly used for the feedback information of CBGs to implement feedback information at the CBG level.

The receiving end can retransmit the unsuccessfully received CBG indicated by the first HARQ bitmap and the second HARQ bitmap. Herein, the unsuccessfully received CBGs indicated by the second HARQ bitmap include unsuccessfully received CBGs other than those indicated by the first HARQ bitmap.

As shown in FIG. 9, the HARQ bitmap and the second HARQ bitmap included in the variable-length DCI are together used for indicating the A/N feedback information of the CBGs in each TB of the HARQ process shown in FIG. 4. In some embodiments, the HARQ bitmap indicates the A/N feedback information of CBGs in two TBs, and the second HARQ bitmap indicates the A/N feedback information of CBGs in the remaining 14 TBs. After receiving the fixed-length DCI and the variable-length DCI, the receiving end can retransmit the CBGs of each TB in the HARQ process as jointly indicated by the HARQ bitmap and the second HARQ bitmap included in the variable-length DCI.

The method further includes: determining the length of the variable-length DCI according to the length of the information contained in the variable-length DCI.

In some embodiments, the length of the variable-length DCI can be adjusted according to the information contained in the DCI, such as the length of the A/N feedback information of CBG. In this way, the variable-length DCI can be adaptive to the A/N feedback information of CBGs of different lengths.

The first HARQ bitmap and the second HARQ bitmap are jointly used for indicating the unsuccessfully received CBGs, thereby extending the length of the feedback information and providing complete CBG feedback information.

In some embodiments, the method further includes at least one of the following: determining frequency domain resource used for receiving the variable-length DCI according to the detection parameter corresponding to the variable-length DCI; determining time domain resource used for receiving the variable-length DCI according to the detection parameter corresponding to the variable-length DCI; and determining length information of the variable-length DCI according to the detection parameter corresponding to the variable-length DCI.

After determining the resource for sending the variable-length DCI, the sending end uses the detection parameter to indicate the transmission resource, and then places it in the fixed-length DCI for being sent to the receiving end. After receiving the fixed-length DCI, the receiving end determines the transmission resource of the variable-length DCI according to the detection parameter, so as to receive the variable-length DCI.

Based on the HARQ feedback information achieved by the fixed-length DCI and variable-length DCI, on the one hand, through adoption of the fixed-length DCI, the complexity of blind detection at the receiving end can be reduced, and the retransmission efficiency of configured grant can be improved; on the other hand, through adoption of the variable-length DCI, different types of HARQ feedback information can be carried, thereby adapting to HARQ feedback information of different lengths. The HARQ feedback information is transmitted in two stages to reduce the size of DCI signaling.

A specific example is provided below in conjunction with any of the foregoing embodiments.

In order to solve the problem of excessive DCI overhead and increased complexity of blind detection at the UE end that may be caused by using a single UL grant to schedule multiple retransmissions of failed CBGs, a new type of DCI is proposed. As shown in FIG. 6, the control information related to the retransmission is carried in the fixed-length DCI. The receiving end detects only the fixed-length DCI during blind detection, and further determines the time-frequency resource location of the variable-length DCI and other information such as CBG A/N based on the control information in the fixed-length DCI.

For the proposed solution, the changes made at the base station side and the terminal side may be as follows.

At the base station side, the base station provides the corresponding indicator bit to indicate which level of HARQ feedback to perform and the corresponding feedback content according to the reception of CBG in each process.

At the terminal side, after receiving the fixed-length DCI, the terminal determines which level of feedback the current HARQ bitmap is based on according to the Flag TB indication, and determines the time-frequency resource location and other information the of the variable-length DCI according to the parameter set index indication, and further performs CBG-based retransmission according to the feedback content.

For the exemplary scenario as shown in FIG. 4, a first scenario that may occur is as follows. CBG transmission errors are present in each of the HARQ processes (1-16), and the corresponding DCI feedback indication and content may be shown in FIG. 9. When there are CBG transmission errors in each of TB (1-16) processes received by the base station, Flag TB is set as 1, thereby indicating that the CBG A/N information is carried in the HARQ bitmap, and the corresponding CBG A/N is carried in the corresponding feedback resource according to the process number. The receiving end only detects the fixed-length DCI during blind detection. According to Flag TB ("1"), it is known that the HARQ bitmap is based on the CBG level. According to the HARQ bitmap, the CBG A/N corresponding to processes 1 and 2 is obtained. The parameter index value can be used for determining time-frequency resources of the variable-length DCI, thereby reading the CBG A/N information, and finally retransmitting the unsuccessfully transmitted CBG on the configured grant resources.

For the exemplary scenario as shown in FIG. 4, a second scenario that may occur is as follows. CBG transmission errors are present in the HARQ processes (2, 5, 9, 10, 11, 13, 15), and all CBG transmissions in the remaining HARQ processes are correct, then the corresponding DCI feedback indication and content may be shown in FIG. 7. When there are CBG transmission errors in only the TB processes (2, 5, 9, 10, 11, 13, 15) received by the base station, and CBG transmission of other TBs is correct, the Flag TB is set as 0, thereby indicating that the TB A/N information is carried in the HARQ bitmap, and the corresponding CBG A/N is carried in the variable-length feedback resource according to the process numbers with transmission error. The receiving end only detects the fixed-length DCI during blind detection. According to Flag TB ("0"), it is known that the HARQ bitmap is based on the TB level. A/Ns corresponding to 16 processes are thus obtained according to the HARQ bitmap. The parameter index value can be used for determining time-frequency resources of the variable-length DCI, thereby reading the CBG A/N information corresponding to failed TB, and finally retransmitting the unsuccessfully transmitted CBG on the configured grant resources.

For the exemplary scenario as shown in FIG. 4, a third scenario that may occur is as follows. There is no CBG transmission error in each of the HARQ processes (1-16). In other words, all HARQ processes are transmitted correctly, then the corresponding DCI feedback indication and content may be shown in FIG. 8. When all TBs in the TB processes (1-16) received by the base station are transmitted correctly, Flag TB is set as 0, thereby indicating that TB A/N information is carried in the HARQ bitmap, and the parameter index value is set as a default value without indicating any time-frequency resource. The receiving end only detects the fixed-length DCI during blind detection. According to Flag TB ("0"), it is known that the HARQ bitmap is based on the TB level. According to the HARQ bitmap, the TB As corresponding to 16 processes are obtained, and the parameter index value at this time does not indicate any time-frequency resources of a variable-length DCI, so all processes do not need to be retransmitted at this time.

Compared with the scheme shown in FIG. 4 that uses a single UL grant to schedule retransmission of multiple HARQ processes on CG resources, the difference and effect of the disclosure mainly lie in the information carried by the new type of DCI, and adoption of the two-stage DCI feedback mechanism. In related art, when multiple wrong CBG retransmissions need to be scheduled, it may cause excessive UL grant overhead and increase the complexity of blind detection at the UE. According to the proposed solution of the disclosure, when multiple wrong CBG retransmissions need to be scheduled, clear indication information is carried by DCI, thereby enabling the UE to determine the current feedback level, the time-frequency resource location of variable-length DCI and the CBG reception of each process according to the indication. The UE can perform CBG-based retransmission according to the CBG A/N situation. Moreover, the fixed-length DCI can be adaptive with the variable-length DCI in length, thereby greatly reducing the complexity of blind detection at the UE.

Figure 11:
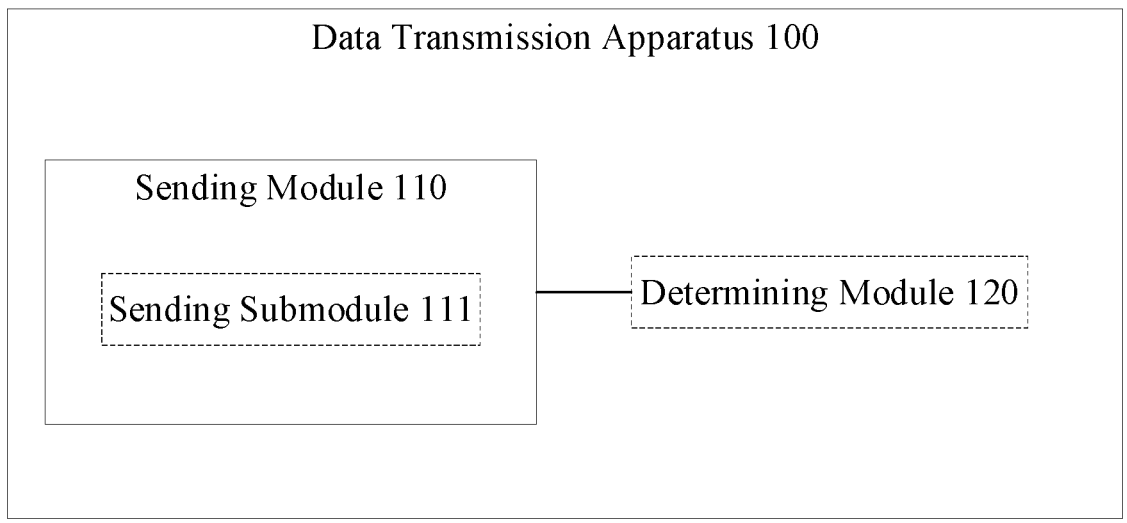
FIG. 11 is a block diagram showing a data transmission apparatus according to some exemplary embodiments.

Some embodiments of the disclosure also provide a data transmission apparatus, which is applied to the sending end of wireless communication. FIG. 11 is a block diagram of the data transmission apparatus 100 according to some embodiments of the disclosure. As shown in FIG. 11, the apparatus 100 includes:

a sending module 110, configured to send a fixed-length DCI, wherein the fixed-length DCI includes a detection parameter corresponding to a variable-length DCI.

In some embodiments, as shown in FIG. 11, the sending module 110 further includes:

a sending submodule 111, configured to send, when the detection parameter indicates the variable-length DCI is to be sent, the variable-length DCI according to the detection parameter;

or, when the detection parameter indicates that no variable-length DCI is to be sent, not to send the variable-length DCI.

In some embodiments, the fixed-length DCI further includes: a first HARQ bitmap and a bitmap flag bit.

When the bitmap flag bit is the first value, the first HARQ bitmap indicates feedback information of a TB in at least one HARQ process, wherein each of the at least one HARQ process transmits one TB.

When the bitmap flag bit is the second value, the first HARQ bitmap indicates feedback information of at least one CBG in at least one TB.

In some embodiments, when the bitmap flag bit is the first value, the variable-length DCI indicates feedback information of at least one CBG in the TB that is not successfully received.

In some embodiments, the variable-length DCI is in the form of a bitmap, indicating feedback information of at least one CBG in the unsuccessfully received TB.

In some embodiments, when the bitmap flag bit has the second value, the variable-length DCI includes a second HARQ bitmap.

The second HARQ bitmap indicates feedback information of a remaining CBG other than the at least one CBG whose feedback information is indicated by the first HARQ bitmap.

In some embodiments, as shown in FIG. 11, the apparatus 100 further includes:

a determining module 120, configured to determine the length of the variable-length DCI according to the length of the information contained in the variable-length DCI.

In some embodiments, the detection parameter corresponding to the variable-length DCI include at least one of the following:

a parameter used for indicating frequency domain resource occupied for sending the variable-length DCI;

a parameter used for indicating time domain resource occupied for sending the variable-length DCI;

a parameter used for indicating length information of the variable-length DCI.

Figure 12:
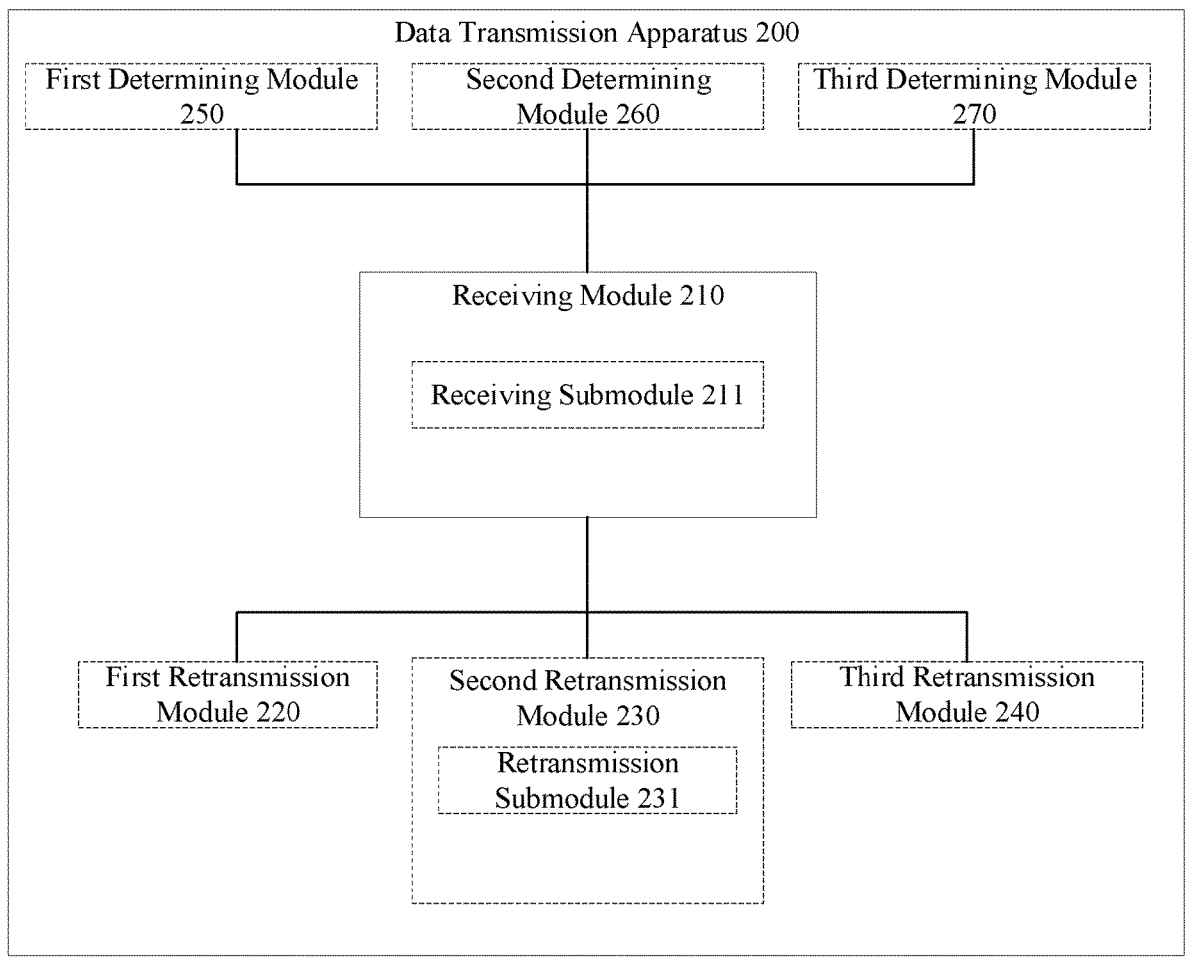
FIG. 12 is a block diagram showing another data transmission apparatus according to some exemplary embodiments.

Some embodiments of the disclosure also provide a data transmission apparatus, which is applied to the receiving end of wireless communication. FIG. 12 is a block diagram of the data transmission apparatus 200 according to some embodiments of the disclosure. As shown in FIG. 12, the apparatus 200 includes:

a receiving module 210, configured to receive a fixed-length downlink control information DCI, where the fixed-length DCI includes a detection parameter corresponding to a variable-length DCI.

In some embodiments, as shown in FIG. 12, the receiving module 210 further includes:

a receiving submodule 211, configured to receive the variable-length DCI according to the detection parameter when the detection parameter indicates that there is a variable-length DCI to be sent;

or, not receive the variable-length DCI when the detection parameter indicates that no variable-length DCI is to be sent.

In some embodiments, the fixed-length DCI further includes: a first HARQ bitmap and a bitmap flag bit.

As shown in FIG. 12, the apparatus 200 further includes:

a first retransmission module 220, configured to retransmit, when the bitmap flag bit is a first value, a TB that is not successfully received in at least one HARQ process according to the first HARQ bitmap; and retransmit, when the bitmap flag bit is a second value, at least one CBG of at least one TB that is not successfully received according to the first HARQ bitmap.

In some embodiments, as shown in FIG. 12, the apparatus 200 further includes:

a second retransmission module 230, configured to, when the bitmap flag bit is the first value, retransmit, according to feedback information indicated by the variable-length DCI and corresponding to at least one CBG in a TB that is not successfully received, the CBG that is not successfully received.

In some embodiments, as shown in FIG. 12, the second retransmission module 230 includes:

a retransmission submodule 231, configured to, when the bitmap flag bit is the first value, retransmit, according to the feedback information indicated by the variable-length DCI in form of a bitmap and corresponding to the at least one CBG in the TB that is not successfully received, the CBG that is not successfully received.

In some embodiments, as shown in FIG. 12, the apparatus 200 further includes:

a third retransmission module 240, configured to, when the bitmap flag bit is the second value, retransmit, according to a second HARQ bitmap included in the variable-length DCI, a CBG that is not successfully received and indicated by the second HARQ bitmap.

In some embodiments, as shown in FIG. 12, the apparatus 200 further includes at least one of the following:

a first determining module 250, configured to determine frequency domain resource used for receiving the variable-length DCI according to the detection parameter corresponding to the variable-length DCI;

a second determining module 260, configured to determine time domain resource used for receiving the variable-length DCI according to the detection parameter corresponding to the variable-length DCI;

a third determining module 270, configured to determine length information of the variable-length DCI according to the detection parameter corresponding to the variable-length DCI.

In some embodiments, the sending module 110, the determining module 120, the receiving module 210 and the like may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic components, so as to execute the foregoing methods.

Figure 13:
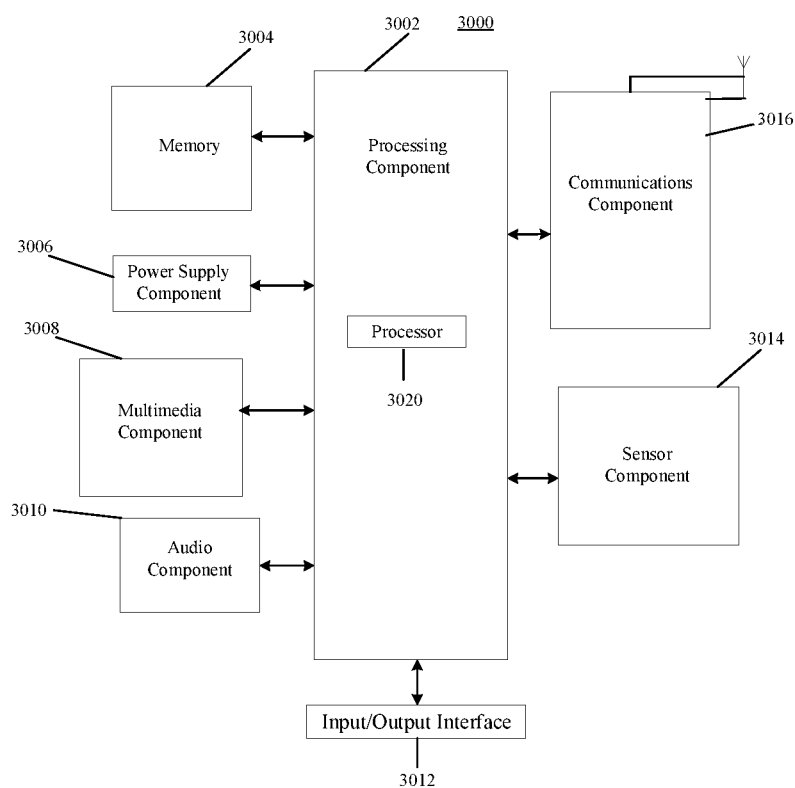
FIG. 13 is a block diagram showing a data transmission device according to some exemplary embodiments.

FIG. 13 is a block diagram showing a device 3000 for data transmission according to some embodiments. For example, the device 3000 may be a mobile phone, a computer, a digital broadcasting terminal, a messaging device, a game console, a tablet device, a medical device, a fitness device, a personal digital assistant, and the like.

Referring to FIG. 13, the device 3000 may include one or more of the following components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the overall operations of the device 3000, such as operations associated with display, telephone calls, data communications, camera operations, and recording operations. The processing component 3002 may include one or more processors 3020 to execute instructions to complete all or part of the steps of the foregoing methods. In addition, the processing component 3002 may include one or more modules to facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the device 3000. Examples of these data include instructions for any application or method operating on the device 3000, contact data, phone book data, messages, pictures, videos, and the like. The memory 3004 can be implemented by any type of volatile or non-volatile storage devices or their combination, such as static random access memory (SRAM), electrically erasable programmable read-only memory (EEPROM), erasable programmable read only memory (EPROM), programmable read only memory (PROM), read only memory (ROM), magnetic memory, flash memory, magnetic disk or optical disk.

The power supply component 3006 provides power for various components of the device 3000. The power supply component 3006 may include a power management system, one or more power supplies, and other components associated with generating, managing, and distributing power to the device 3000.

The multimedia component 3008 includes a screen that provides an output interface between the device 3000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or slide action, but also detect the duration and pressure associated with the touch or slide operation. In some embodiments, the multimedia component 3008 includes a front camera and/or a rear camera. When the device 3000 is in an operation mode, such as a shooting mode or a video mode, the front camera and/or the rear camera can receive external multimedia data. Each front camera and rear camera can be a fixed optical lens system or have focal length and optical zoom capabilities.

The audio component 3010 is configured to output and/or input audio signals. For example, the audio component 3010 includes a microphone (MIC), and when the device 3000 is in an operation mode, such as a call mode, a recording mode, and a voice recognition mode, the microphone is configured to receive external audio signals. The received audio signal may be further stored in the memory 3004 or transmitted via the communication component 3016. In some embodiments, the audio component 3010 further includes a speaker for outputting audio signals.

The I/O interface 3012 provides an interface between the processing component 3002 and a peripheral interface module. The peripheral interface module may be a keyboard, a click wheel, a button, and the like. These buttons may include but are not limited to: home button, volume button, start button, and lock button.

The sensor component 3014 includes one or more sensors for providing the device 3000 with various aspects of status assessment. For example, the sensor component 3014 can detect the on/off status of the device 3000 and the relative positioning of components, such as the display and the keypad of the device 3000. The sensor component 3014 can also detect the position change of the device 3000 or a component of the device 3000, the presence or absence of contact with the device 3000, the orientation or acceleration/deceleration of the device 3000 and the temperature change of the device 3000. The sensor component 3014 may include a proximity sensor configured to detect the presence of nearby objects when there is no physical contact. The sensor component 3014 may also include a light sensor, such as a CMOS or CCD image sensor, for use in imaging applications. In some embodiments, the sensor component 3014 may also include an acceleration sensor, a gyroscope sensor, a magnetic sensor, a pressure sensor or a temperature sensor.

The communication component 3016 is configured to facilitate wired or wireless communication between the device 3000 and other devices. The device 3000 can access a wireless network based on a communication standard, such as Wi-Fi, 2G or 3G, or a combination thereof. In some embodiments, the communication component 3016 receives a broadcast signal or broadcast related information from an external broadcast management system via a broadcast channel. In some embodiments, the communication component 3016 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In some embodiments, the device 3000 may be implemented by one or more application specific integrated circuits (ASIC), digital signal processors (DSP), digital signal processing device (DSPD), programmable logic devices (PLD), field programmable gate array (FPGA), controller, microcontroller, microprocessor, or other electronic components, so as to implement the above methods.

In some embodiments, there is also provided a non-transitory computer-readable storage medium including instructions, such as a memory 3004 including instructions, which may be executed by the processor 3020 of the device 3000 to complete the foregoing method. For example, the non-transitory computer-readable storage medium may be ROM, random access memory (RAM), CD-ROM, magnetic tape, floppy disk, optical data storage device, etc.

Based on the method, apparatus, and storage medium for data transmission according to the disclosure, a fixed-length DCI is sent, where the fixed-length DCI includes a detection parameter corresponding to a variable-length DCI. In this way, on the one hand, the complexity of blind detection at the receiving end can be reduced through the fixed-length DCI, thereby improving the efficiency of receiving the fixed-length DCI. On the other hand, the detection parameter can provide indications and resource information for receiving the variable-length DCI, thereby improving the efficiency of receiving the variable-length DCI, reducing the difficulty of blind detection of the variable-length DCI and, thus, reducing excessive power consumption of the blind detection.

After considering the specification and practicing the disclosure disclosed herein, those skilled in the art will easily think of other implementations of the embodiments of the disclosure. This application is intended to cover any variations, uses, or adaptive changes of the embodiments of the disclosure. These variations, uses, or adaptive changes follow the general principles of the embodiments of the disclosure and include those common knowledge or conventional technical means in the art not disclosed in the embodiments of the disclosure. The description and the embodiments are to be regarded as exemplary only, and the scope and spirit of the embodiments of the disclosure are pointed out by the following claims.

It should be understood that the embodiments of the disclosure are not limited to the precise structure that has been described above and shown in the accompanying drawings, and various modifications and changes can be made without departing from the scope thereof. The scope of the embodiments of the disclosure is only limited by the appended claims.

What is claimed is:

1. A data transmission method, comprising:
sending, by a network device, a fixed-length downlink control information (DCI), wherein the fixed-length DCI comprises a detection parameter corresponding to a variable-length DCI; and
sending, by the network device in response to that the detection parameter indicates the variable-length DCI is to be sent, the variable-length DCI according to the detection parameter, wherein,
the fixed-length DCI further comprises: a first hybrid automatic repeat request (HARQ) bitmap and a bitmap flag bit,
in response to that the bitmap flag bit is a first value, the first HARQ bitmap indicates feedback information of a transport block in at least one HARQ process, wherein each of the at least one HARQ process transmits one transport block; and
in response to that the bitmap flag bit is a second value, the first HARQ bitmap indicates feedback information of at least one code block group of at least one transport block.

2. The method according to claim 1, further comprising:
in response to that the bitmap flag bit is the first value, the variable-length DCI indicates feedback information of at least one code block group in a transport block that is not successfully received.

3. The method according to claim 2, wherein the variable-length DCI is in form of a bitmap used for indicating the feedback information of the at least one code block group in the transport block that is not successfully received.

4. The method according to claim 1, further comprising:
in response to that the bitmap flag bit is the second value, the variable-length DCI comprises a second HARQ bitmap;
wherein the second HARQ bitmap indicates feedback information of a remaining code block group other than the at least one code block group whose feedback information is indicated by the first HARQ bitmap.

5. The method according to claim 1, further comprising:
determining, by the network device, a length of the variable-length DCI according to a length of information contained in the variable-length DCI.

6. The method according to claim 1, wherein the detection parameter corresponding to the variable-length DCI comprises at least one of:
a parameter indicating frequency domain resource occupied for sending the variable-length DCI;
a parameter indicating time domain resource occupied for sending the variable-length DCI; or
a parameter indicating length information of the variable-length DCI.

7. A data transmission method, comprising:
receiving, by a terminal device, a fixed-length downlink control information (DCI), wherein the fixed-length DCI comprises a detection parameter corresponding to a variable-length DCI; and
receiving, by the terminal device in response to that the detection parameter indicates the variable-length DCI is to be sent, the variable-length DCI according to the detection parameter, wherein,
the fixed-length DCI further comprises: a first hybrid automatic repeat request (HARQ) bitmap and a bitmap flag bit,
in response to that the bitmap flag bit is a first value, retransmitting, by the terminal device according to the first HARQ bitmap, a transport block that is not successfully received in at least one HARQ process;
in response to that the bitmap flag bit is a second value, retransmitting, by the terminal device according to the first HARQ bitmap, at least one code block group of at least one transport block that is not successfully received.

8. The method according to claim 7, further comprising:
in response to that the bitmap flag bit is the first value, retransmitting, by the terminal device according to feedback information indicated by the variable-length DCI and corresponding to at least one code block group in a transport block that is not successfully received, the code block group that is not successfully received.

9. The method according to claim 8, wherein the retransmitting the code block group that is not successfully received comprises:
retransmitting, by the terminal device according to the feedback information indicated by the variable-length DCI in form of a bitmap and corresponding to the at least one code block group in the transport block that is not successfully received, the code block group that is not successfully received.

10. The method according to claim 9, further comprising:
in response to that the bitmap flag bit is the second value, retransmitting, by the terminal device according to a second HARQ bitmap comprised in the variable-length DCI, a code block group that is not successfully received and indicated by the second HARQ bitmap.

11. The method according to claim 7, further comprising at least one of:
determining, by the terminal device, frequency domain resource used for receiving the variable-length DCI according to the detection parameter corresponding to the variable-length DCI;
determining, by the terminal device, time domain resource used for receiving the variable-length DCI according to the detection parameter corresponding to the variable-length DCI;
determining, by the terminal device, length information of the variable-length DCI according to the detection parameter corresponding to the variable-length DCI.

12. A data transmission device, comprising a processor, a memory, and an executable program stored on the memory and executable by the processor, wherein the processor is configured to, when executing the executable program, perform steps of:
sending a fixed-length downlink control information (DCI), wherein the fixed-length DCI comprises a detection parameter corresponding to a variable-length DCI, and sending, in response to that the detection parameter indicates the variable-length DCI is to be sent, the variable-length DCI according to the detection parameter; or
receiving a fixed-length DCI, wherein the fixed-length DCI comprises a detection parameter corresponding to a variable-length DCI, and receiving, in response to that the detection parameter indicates the variable-length DCI is to be sent, the variable-length DCI according to the detection parameter,
wherein,
the fixed-length DCI further comprises: a first hybrid automatic repeat request (HARQ) bitmap and a bitmap flag bit,
in response to that the bitmap flag bit is a first value, the first HARQ bitmap indicates feedback information of a transport block in at least one HARQ process, wherein each of the at least one HARQ process transmits one transport block; and
in response to that the bitmap flag bit is a second value, the first HARQ bitmap indicates feedback information of at least one code block group of at least one transport block.

* * * * *